(12) United States Patent
Flavel et al.

(10) Patent No.: US 10,440,104 B2
(45) Date of Patent: *Oct. 8, 2019

(54) LOAD BALANCING WITH LAYERED EDGE SERVERS

(71) Applicant: Microsoft Technology Licensing, LLC, Redmond, WA (US)

(72) Inventors: Ashley Flavel, Seattle, WA (US); Pradeepkumar Mani, Issaquah, WA (US); Nick Holt, Seattle, WA (US); David Maltz, Bellevue, WA (US); Jie Liu, Medina, WA (US); Oleg Surmachev, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/897,778

(22) Filed: Feb. 15, 2018

(65) Prior Publication Data

US 2018/0176295 A1 Jun. 21, 2018

Related U.S. Application Data

(63) Continuation of application No. 14/297,372, filed on Jun. 5, 2014, now Pat. No. 9,923,959.

(51) Int. Cl.
*H04L 29/08* (2006.01)
*H04L 12/26* (2006.01)
*H04L 29/12* (2006.01)

(52) U.S. Cl.
CPC ........ *H04L 67/1008* (2013.01); *H04L 43/062* (2013.01); *H04L 61/1511* (2013.01); *H04L 67/1095* (2013.01); *H04L 69/321* (2013.01)

(58) Field of Classification Search
CPC ............... H04L 67/1095; H04L 69/321; H04L 61/1511; H04L 67/1008; H04L 43/062
See application file for complete search history.

(56) References Cited

U.S. PATENT DOCUMENTS 7,289,519 B1 10/2007 Liskov
7,574,499 B1 8/2009 Swildens et al.
(Continued)

FOREIGN PATENT DOCUMENTS

GB 2445173 A2 4/2012
WO WO-2010028696 A1 3/2010

OTHER PUBLICATIONS

Adhikari, et al., "Where Do You "Tube?" Uncovering YouTube Server Selection Strategy", In Proceedings of 20th International Conference on Computer Communications and Networks, Jul. 31, 2011, pp. 1-6.

(Continued)

*Primary Examiner* — Yemane Mesfin
*Assistant Examiner* — Henry Baron
(74) *Attorney, Agent, or Firm* — Ray Quinney & Nebeker P.C.; James Bullough

(57) ABSTRACT

N nodes are assigned to a first layer of nodes having a first domain name server (DNS) anycast Internet Protocol (IP) address and a first fully qualified domain name (FQDN). M nodes are assigned to a second layer of nodes having a second DNS anycast IP address and a second FQDN. When a request to resolve the first FQDN for the first layer of nodes is received by a DNS of a node of the first layer and a load on the ES of the node is less than a threshold, the DNS handles the request by returning an edge server (ES) anycast IP address for the ES of the node. When the load on the ES is greater than the threshold, the DNS offloads the request by returning the second FQDN so that the second FQDN of the second layer is resolved to the second DNS anycast IP address.

20 Claims, 7 Drawing Sheets

(56) References Cited

U.S. PATENT DOCUMENTS

| | | |
|---|---|---|
| 7,797,426 B1 | 9/2010 | Lyon |
| 8,073,953 B2 | 12/2011 | Christian et al. |
| 8,447,862 B2 | 5/2013 | Sakata et al. |
| 8,607,014 B2 | 12/2013 | Spatscheck et al. |
| 2011/0153719 A1 | 6/2011 | Santoro et al. |
| 2011/0153941 A1 | 6/2011 | Spatscheck et al. |
| 2015/0215388 A1 | 7/2015 | Kontothanassis et al. |

OTHER PUBLICATIONS

Alzoubi et al, "Anycast CDNs Revisited", In Proceedings of the 17th International Conference on World Wide Web, Apr. 21, 2008, 10 Pages.

Alzoubi, et al., "A Practical Architecture for an Anycast CDN", In Journal of ACM Transactions on the Web, vol. 5, Issue 4, Oct. 2011, pp. 1-33.

Bathula, et al. "Load-Aware Anycast Routing in IP-over-WDM Networks", In Proceedings of IEEE International Conference on Communications, Jun. 2011; 6 Pages.

Flavel, Ashley, "BGP, Not As Easy as 1-2-3", In Phd Thesis, Oct. 6, 2009, 18 pages.

Hartmanis et al. "Server Load Balancing with Network Support: Active Anycast", In Proceedings of Second International Working Conference, Oct. 16, 2000; 8 Pages.

Huang, et al., "A DNS Reflection Method for Global Traffic Management", In Proceedings of the USENIX Conference on USENIX Annual Technical Conference, Jun. 23, 2010, pp. 1-6.

International Search Report & Written Opinion Received for PCT Patent Application No. PCT/US2015/034087, dated Sep. 9, 2015, 14 pages.

Levine, et al., "TCP Anycast—Don't believe the FUD", Retrieved on Mar. 31, 2014 Available at: https://www.nanog.org/meetings/nanog37/presentations/matt.levine.pdf.

Rexford, et al., "BGP Routing Stability of Popular Destinations", In Proceedings of the 2nd ACM SIGCOMM Workshop on Internet Measurement, Nov. 6, 2002, 6 pages.

Stewart, et al., "BGP4: Inter-Domain Routing in the Internet", In Proceedings of Addision-Wesley Networking Basics Series, Dec. 24, 1998, 137 pages.

Wollman, et al. "Plug and Play Server Load Balancing and Global Server Load Balancing for Tactical Networks" In IEEE Military Communications Conference, vol. 2, Oct. 13, 2003. 5 Pages.

"Office Action Issued in European Patent Application No. 15729703.7", dated Feb. 28, 2018, 6 Pages.

"First Office Action and Search Report Issued in Chinese Patent Application No. 201580029680.2", dated Dec. 4, 2018, 17 Pages.

U.S. Appl. No. 14/297,372, filed Jun. 5, 2014.

LOAD BALANCING WITH LAYERED EDGE SERVERS

CROSS-REFERENCE TO RELATED APPLICATIONS

The present application is a continuation of U.S. patent application Ser. No. 14/297,372, filed Jun. 5, 2014. The entire disclosure of the application referenced above is incorporated by reference.

BACKGROUND

Content data networks ("CDNs") typically provide clusters of servers that serve content in response to requests sent via the Internet using the hypertext transport protocol ("HTTP"). To send a service request to the CDN, the client first sends a resolution request with the fully qualified domain name ("FQDN") of the CDN to a domain name server ("DNS") system to resolve the FQDN to the corresponding Internet protocol ("IP") address of the CDN. The DNS system contains a mapping of FQDN to IP addresses. For example, the DNS system may map the FQDN of "acme.com" to the IP address of "192.168.1.1." After receiving the IP address of the CDN, the client sends the service request to that IP address. Upon receiving the service request, the CDN processes the request and sends a response to the client.

The DNS system provides a hierarchy of DNSs for resolving FQDNs. At the top of the hierarchy is a root DNS. The root DNS has a mapping of top-level domain names (e.g., ".org" or ".com") to IP addresses of top-level DNSs. A top-level DNS provides a mapping of domain names to IP addresses of domain-specific DNSs. A domain-specific DNS provides a mapping of domain-specific names to IP addresses of CDN servers. To resolve a FQDN, a client, which knows the IP address of the root DNS, sends a resolution request with the FQDN (e.g., "acme.com") to that IP address of the root DNS. The root DNS returns the IP address for the top-level DNS for ".com" domain. The client then sends a resolution request with the FQDN to the returned IP address of the top-level DNS. The top-level DNS returns an IP address for the domain-specific DNS for the "acme.com" domain. The client then sends a resolution request with the FQDN to the IP address of the domain-specific DNS. The domain-specific DNS returns the IP address of a CDN server. The client then sends a service request to the IP address of the CDN server.

The routing of a request from a client to an IP address can take a variety of paths based on the routing algorithms of the hierarchy of networks that form the Internet. The hierarchy of networks includes a high-level network, internet service provider ("ISP") networks, and for each ISP network, and domain networks. The high-level network routes messages between ISP networks. Each ISP network routes messages internally between domain networks connected via the ISP network and externally between a domain network of ISP network and a domain network connected via another ISP network. Each domain network routes messages internally between devices of the domain network and externally between devices of the domain network and the devices of other domain networks via the ISP network that connects the domain network to the Internet.

Messages routed from originating domains to destination domains may need to travel through many routers. For example, the message may need to travel from a client in the originating domain network through several routers within each of the originating domain network, the ISP network for the originating domain network, the top-level network, the ISP network for the destination domain network, and the destination domain network before reaching a server (e.g., CDN server) in the destination domain network.

Because the routing through the Internet can take a considerable amount of time, the networks of the Internet often position their routers and servers at geographically distributed locations. The routing algorithms attempt to route messages to a server in the destination domain network that is geographical close to the client in the source domain network in order to reduce the travel time of the message. For example, a CDN may have an edge server located on each continent to help ensure that messages sent from clients on each continent are routed to the edge server on that continent. Once a message is received at an edge server, the message can be sent within the CDN (e.g., via a fiber optic link) to a CDN server for processing that request. Although CDN edge servers can function simply as a pass-through for messages between clients and a CDN server, the CDN edge server may provide some of the functionality of the CDN. For example, an edge server may cache content so that it can respond to some requests and avoid sending those requests to a CDN server.

To help ensure that messages are routed to edge servers that are close to clients, the DNS for a CDN may try to determine the location of the client (e.g., using an IP geo-location database). Once the location is determined, the DNS for the CDN can return the IP address of the closest edge server. Although placement of edge servers can help reduce travel time, an edge server may be a bottleneck when message traffic being routed to that edge server is high. For example, message traffic may be high on one continent because of some political unrest. In such a case, the edge server on that continent may be overloaded while an edge server on another continent may have plenty of unused capacity.

Various approaches have been used to help prevent such overloading. One approach for preventing such overloading is for each edge server to report its load to a load balancing server of the domain. When the load balancing server detects that the load on an edge server is overloaded, the load balancing server can instruct the domain DNSs to start returning to clients, which would normally receive the IP address of the overloaded edge server, the IP address of another edge server that is not overloaded. One problem with such an approach is that the overhead of transmitting the load information from the edge servers and distributing the instructions to the domain DNSs can be high.

Another approach for preventing such overloading is for a domain network to use IP anycasting technology for the IP addresses of its edge servers. IP anycasting technology allows each edge server to have the same IP address (an "anycast IP address). When a message is sent to that anycast IP address, the message can be routed to any of the edge servers but typically to the one closest to the originating client. If an edge server becomes overloaded, then the routing of messages to that edge server from one or more ISPs can be blocked to reduce the load. Since the edge servers use IP anycasting technology, those blocked messages will be routed to another edge server that is not blocked from those ISPs. A problem with blocking messages from an ISP is that existing connections are dropped and will need to be reestablished with a different edge server. Moreover, in some cases, the messages from a blocked ISP may be routed through a non-blocked ISP back to the same overloaded edge server, which may result in the edge server remaining overloaded.

SUMMARY

A routing system and method for controlling a node with a DNS and an associated edge server of a network to load balance traffic for the associated edge server is provided. In some embodiments, the routing system accesses a DNS anycast IP address for the DNS and an FQDN. The node is assigned to a layer of nodes from an innermost layer to an outermost layer. The DNS anycast IP address is for the DNSs of the assigned layer, and the FQDN is for the assigned layer. When a request to resolve the FQDN for the assigned layer is received by the DNS, the DNS determines whether the load on the associated edge server indicates that the DNS should be offloading the load from the associated edge server. If so, the DNS handles the request by returning an edge server anycast IP address for the associated edge server. If not, the DNS offloads the request by returning the FQDN of an inner layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
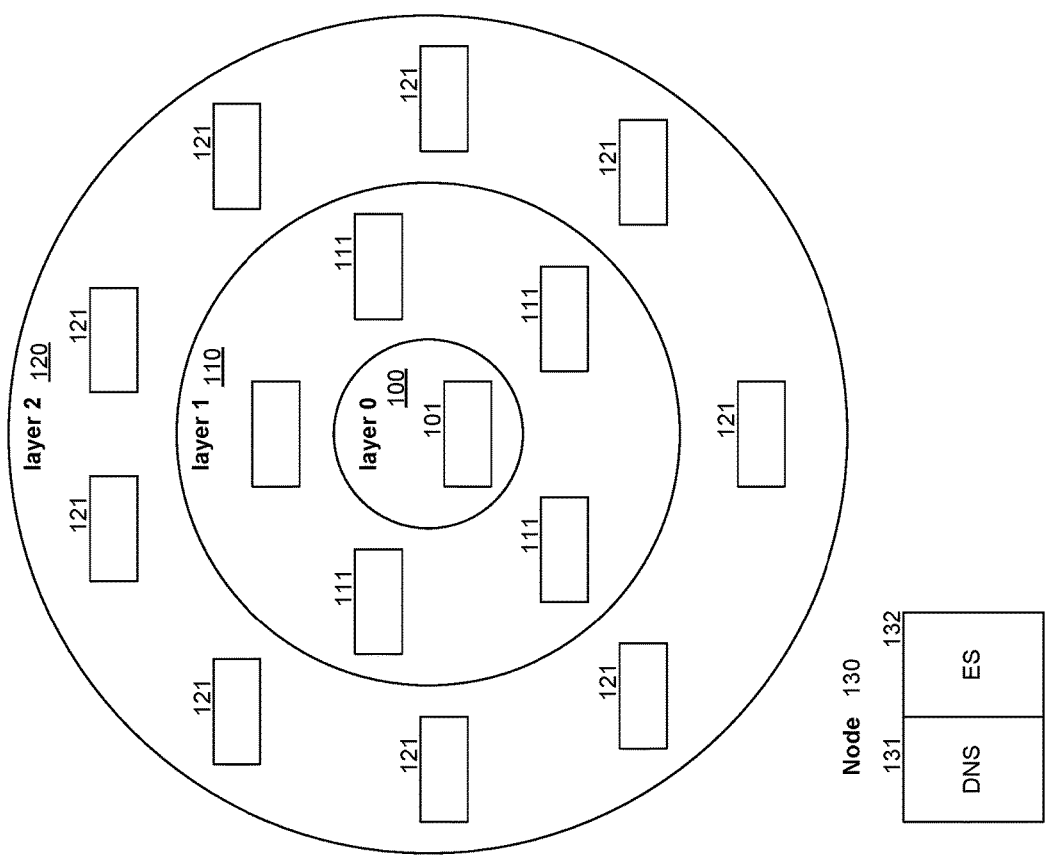
FIG. 1 is a block diagram that illustrates layers of the routing system for a domain network in some embodiments.

A system and method for load balancing between systems (e.g., edge servers) of a network is provided. In some embodiments, a routing system defines groups of systems and name resolution systems (e.g., DNSs) for the network. Each system is associated with a name resolution system. The combination of a system and its associated name resolution system may be considered a self-load-balancing node and may execute on the same computer. Each group has a domain name and an anycast address for the name resolution systems. The groups may be considered to be layers, and the outermost (or highest) layer may have its nodes at geographically dispersed locations to provide quick response times to nearby clients. The inner (or lower) layers would typically have fewer nodes but still may have more overall capacity. When a name resolution system in the outer layer receives a resolution request with the domain name of that layer, it typically returns an address for the associated system. Since anycasting technology will try to find the closest name resolution system to the client, the associated system is likely the closest system to the client so that the client typically connects to the closest system. If, however, the associated system needs to have its load reduced (e.g., because of overloading), the name resolution system, instead of returning the address of the associated system, returns the domain name of the next inner layer. The client can then repeat the process with the returned domain name to connect to a system in the next inner layer. If that system is also overloaded, the domain name of next inner layer is returned and the process is repeated. Because the systems of the outer layer are geographically distributed, the clients are typically connected to the closest system. If, however, a system needs to have its load reduced, the associated name resolution system can make that determination and direct clients to the domain name for the next inner layer without the overhead of sending messages to and receiving messages from a load balancing server.

In some embodiments, the routing system may specify a one-to-one correspondence between systems and DNSs. For example, the routing system may define three layers. The outer layer may have 30 systems and 30 DNSs, the next layer may have 10 systems and 10 DNSs, and the innermost layer may have 5 systems and 5 DNSs. The routing system assigns a different DNS anycast IP address and a different domain name to each of the layers. For example, the outer layer may have the domain name of "acme.com," the middle layer may have the domain name of "acme1.com," and the innermost layer may have the domain name of "acme0.com." The domain names are registered with the DNS system, and each DNS in the layer announces the DNS anycast IP address for that layer. When a client sends a resolution request with a domain name of one of the layers, the DNS system directs the client to send the resolution request to the DNS anycast IP address for the layer. The client then sends a resolution request with the domain name of the layer to the DNS anycast IP address for the layer. When one of the DNSs of the layer receives the resolution request, it typically returns a system IP address for the system that is associated with that DNS and the client then sends a service request to that system IP address. If, however, the load on the associated system should be reduced, that DNS instead directs the client to send a resolution request with the domain name of the next inner layer. The client then repeats the process, but this time will be directed by the DNS system to send the resolution request to the DNS anycast IP address of the next inner layer. When a DNS of the next inner layer receives the resolution request, it returns the system IP address for its associated system (assuming the load on that system does not need to be reduced). The client can then send a service request to the returned system IP address to reduce the load on the system of the outer layer.

In the following, although the routing system is described in the context of edge servers, the routing system may be used in conjunction with systems that might not be considered edge servers. Also, the routing system may be adapted to address protocols that are not compatible with the IP but provide an anycast-type technology. An anycast address (e.g., IP anycast address) of an anycast-type technology is an address that results in delivery of a message to anyone of multiple destinations. The destination to which the message is to be delivered is typically determined by the routing algorithms of the routing infrastructure. Also, the routing system may be used to reduce the load on an edge server for reasons other than overloading. For example, if an edge server is going out of service for repairs, the routing system can directed its associated DNS to start offloading load from the edge server to reduce the number of connections that are broken when the edge server eventually goes out of service.

In some embodiments, the routing system may specify a system anycast IP address for each layer so that each layer may have its own edge server anycast IP address. Each edge server announces the edge server anycast IP address for its assigned layer. Each DNS of a layer directs clients to send a service request to the edge server anycast IP address for that layer. Although anycasting IP technology does not guarantee that the service request will be sent to the edge server associated with that DNS, in practice a significant majority of the service requests are sent to the associated edge server.

In some embodiments, a load-balancing node may be a computer that provides the functionality of both an edge server and its associated DNS or may be computers in the same local area network. When an edge server and its associated DNS are geographically close, the chance of a client connecting through the edge server associated with DNS is high because of anycast IP technology. Even if the edge server and its associated DNS are not geographically close enough to be on the same local area network but still relatively close and connected via the same ISP, then the chance of connecting through that associated server is still relatively high. Also, the routing system may not have a one-to-one correspondence between edge servers and DNSs. For example, a single DNS may be associated with multiple edge servers that are geographically close to the DNS. If each edge server has its own IP address, then the routing system can direct the DNS to start offloading some of the load from an overloaded edge server.

In some embodiments, a load-balancing node may be assigned to multiple layers. Each node may be assigned to an inner layer and all outer layers. For example, a node assigned to layer 0 of a three-layer system may also be assigned to layers 1 and 2, and a node assigned to layer 1 may also be assigned to layer 2. When a node is assigned to multiple layers, the node announces the DNS anycast IP address for each assigned layer. When the DNS of the node receives a resolution request directed to the domain name of any of its layers, it returns the edge IP address for its associated edge server if it is not offloading. If the DNS is offloading, it directs the client to the domain name of a layer that is lower than its lowest assigned layers. For example, if a node is assigned to layer 3, 4, and 5 in a six-layer system, then the DNS would direct offloading to the domain name of layer 2. In this way, the capacity of the inner layers can be used to handle service requests under normal operations and not just when an edge server is overloaded.

In some embodiments, the routing system may include a load controller that monitors the load of an edge server and instructs the DNS when to start reducing the load of that edge sever. The load controller determines whether the load satisfies an offloading criterion and if so, it instructs the DNS to start offloading. The offloading criterion may be based on various factors such as whether the central processing unit ("CPU") utilization is above a threshold percentage. Other factors may be the current number of connections to clients, network traffic, memory utilization, and various other combinations of factors. The load controller may use a graduated approach for offloading and terminating the offloading. For example, the load controller may direct the DNS to redirect an offloading percentage of the resolution requests to another layer. That offloading percentage may increase geometrically or exponentially based on the amount of overloading. For example, if the CPU utilization is 5% above the threshold percentage, then the load controller may direct the DNS to offload 5% of its resolution requests. But, if the CPU utilization is 10% above the threshold percentage, then the load controller may direct the DNS to offload 20% of its resolution requests. In contrast, when the CPU utilization that is above the threshold percentage but trending lower, the load controller may reduce the offloading percentage only linearly to reduce any chance that the load may increase as a result of reducing the offloading too much.

FIG. 1 is a block diagram that illustrates layers of the routing system for a domain network in some embodiments. In this example, the routing system has three layers: layer 0 100, layer 1 110, and layer 2 120. Layer 0 is the innermost layer, and layer 2 is the outermost layer. The nodes 101, 111, and 121 are assigned to layer 0, layer 1, and layer 2, respectively. As illustrated by example node 130, each node includes a DNS 131 and an edge server 132. The sizes of the edge servers represent the different capacities of the edge servers. Layer 2 has the most edge servers, but each edge server has the lowest capacity for handling service requests. Layer 0 has the fewest edge servers, but each edge server has the highest capacity for handling service requests. Each layer has its own domain name and its own DNS anycast IP address. When a client first requests to connect to the domain network using the domain name of layer 2, the client is directed to a DNS in layer 2, which directs the client to connect through its associated edge server, which is also in layer 2, unless the DNS has been instructed by a load controller to start offloading. If the DNS of layer 2 is offloading, the DNS provides the domain name of layer 1 to the client. The client then requests to connect to the domain network using the domain name of layer 1. The client is directed to a DNS in layer 1, which directs client to connect through its associated edge server, which is also in layer 1, unless that DNS has been instructed by the load controller to start offloading. If the DNS of layer 1 is offloading, the DNS provides the domain name of layer 0 to the client. The client then requests to connect to the domain network using the domain name of layer 0. The client is directed to a DNS in layer 0 that directs the client to connect through its associated edge server, which is also in layer 0. Since there are no lower layers, the routing system may use other techniques for load-balancing when an edge server at layer 0 is overloaded. For example, each edge server may have also have its own unique edge IP address in addition to its edge server anycast IP address for its assigned layer. In such a case, the DNS at layer 0 may return the unique IP address of an edge server randomly to distribute the load throughout the edge servers.

Figure 2:
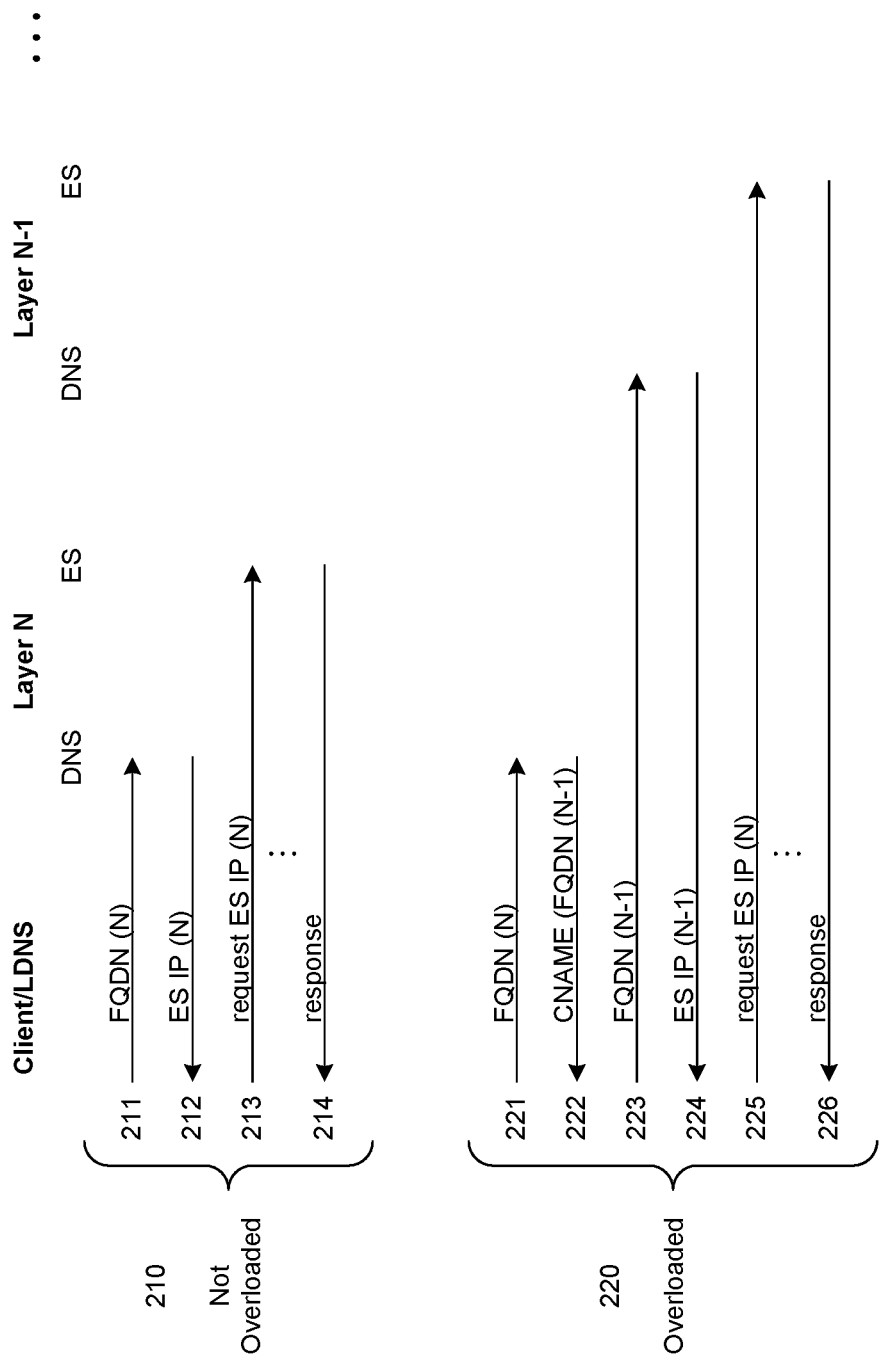
FIG. 2 is a block diagram that illustrates communications to establish a connection through an edge server in some embodiments.

FIG. 2 is a block diagram that illustrates communications to establish a connection through an edge server in some embodiments. When a client sends a resolution request, it may be actually be sent through a local DNS ("LDNS") that is executing on the same computer or on a different computer in the same local area network as the client. The LDNS resolves the domain name provided by the client and returns the edge IP address to the client. Communication diagram 210 illustrates communications when a client is directed to an edge server at the outermost layer that is not overloaded, and communication diagram 220 illustrates communications when a client is directed to an edge server at the outermost layer that is overloaded. Referring to communication diagram 210, the client is eventually directed by the DNS system to send 211 a resolution request with the fully qualified domain name of the outermost layer to the DNS anycast IP address for the outermost layer. A DNS in the outer layer, which is typically the closest geographically to the client, determines that no offloading is needed and sends 212 a response with the edge IP address of an associated at edge server in the outermost layer. After receiving the edge IP address, the client sends 213 a request to connect to that edge IP address and is connected to an edge server associated with that DNS. The associated edge server then sends a response 214 to establish the connection (e.g., HTTP connection). If the edge IP address is an edge server anycast IP address, then the client may be connected to a different edge server in the outermost layer or an edge server in an inner layer depending on the load. Referring to communication diagram 220, the client is eventually directed by the DNS system to send 221 a resolution request with the fully qualified domain name of the outermost layer to the DNS anycast IP address for the outermost layer. Since the DNS has determined that offloading is needed, the DNS sends 222 a response with the fully qualified domain name of the next lower layer. The DNS may store in its zone files, which map fully qualified domain names to IP addresses, the fully qualified domain name of the next inner layer in a canonical name record ("CNAME") as instructions to direct the client that provides the fully qualified domain name of the outermost layer to the fully qualified domain name of the next inner layer. The DNS at the outermost layer uses the canonical name record when offloading. The client then sends to the DNS system a resolution request with the fully qualified domain name of the next inner layer. The DNS system eventually directs the client to the DNS anycast IP address for the next inner layer. The client then sends 223 a resolution request with the fully qualified domain name for the next inner layer, which is routed to a DNS in the next inner layer. If the DNS in the next inner layer is not offloading, it sends 224 a response with the edge IP address of an associated edge server. After receiving the response, the client sends a request 225 to connect to an edge server with that edge IP address. The associated edge server then sends a response 226 to establish the connection (e.g., HTTP connection).

Figure 3:
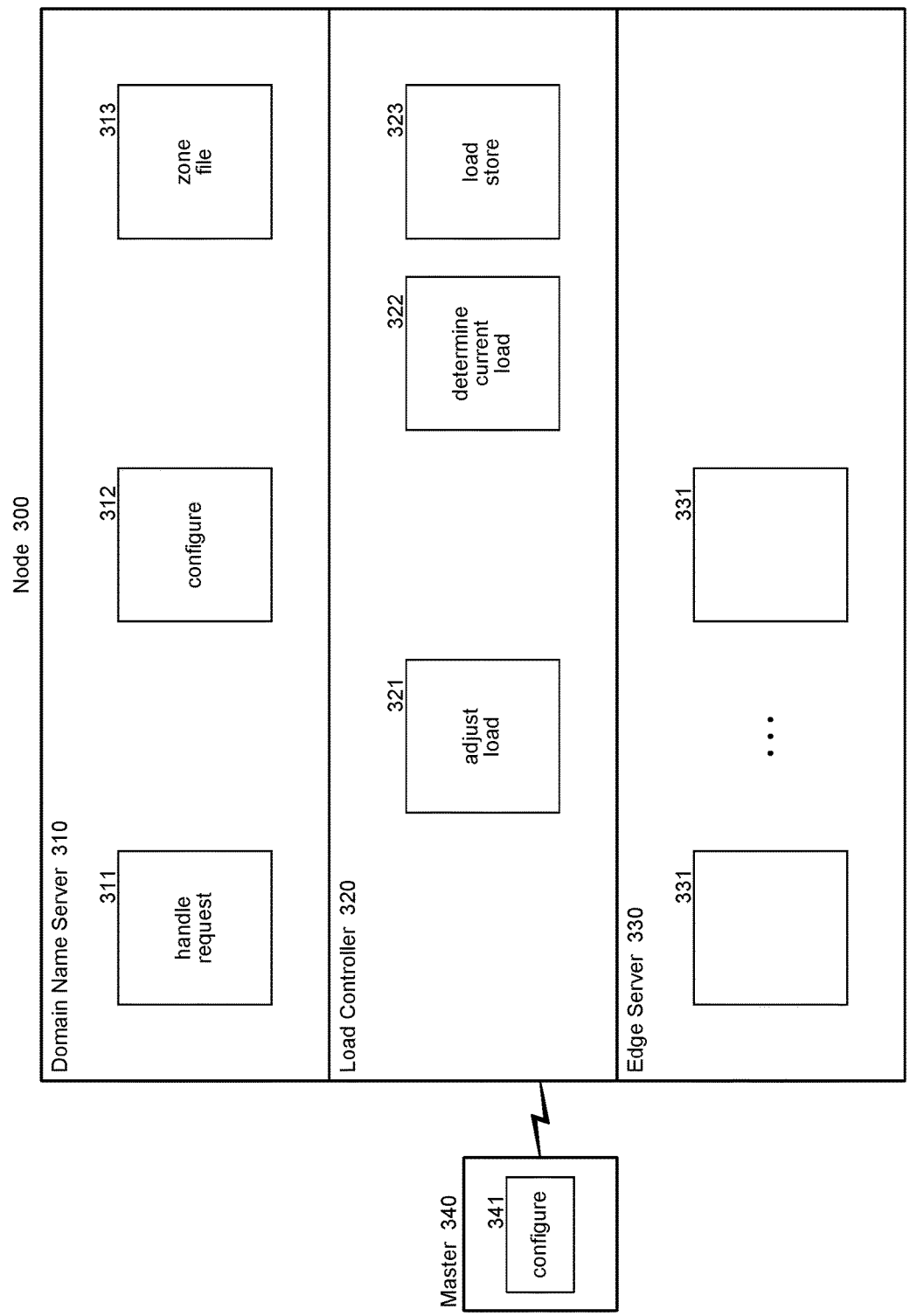
FIG. 3 is a block diagram that illustrates components of a node in some embodiments.

FIG. 3 is a block diagram that illustrates components of a node in some embodiments. A node 300 includes a DNS 310, a load controller 320, and an edge server 330. All the nodes may be connected to a master device 340. The DNS may include a handle request component 311, a configure component 312, and zone files 313. The handle request component receives resolution requests and resolves requests in accordance with the offloading instructions of the load controller. The configure component configures the DNS to announce the DNS anycast IP address for the node and set up the zone files to support offloading to the domain name of the next lower layer. The zone files contain the mapping of domain names to IP addresses and the canonical records mapping a domain name to another domain name. The load controller includes an adjust load component 321, a determine load component 322, and a load store 323. The adjust load component is invoked to instruct the DNS whether to offload and provides an offloading percentage. The determine current load component determines the current load of the edge server. The determine current load component may be invoked periodically (e.g., based on a timer) and invokes the adjust load component passing the current load. The load store is a repository of the load on the edge server as determined by the determine current load component to be used by the adjust load component. The edge server has various components 331 that provide functionality that is specific to the edge server. The master device 340 includes configure component 341, which is responsible for sending configuration information to the nodes of the routing system.

The computing devices and systems on which the routing system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the routing system. The data transmission media is used for transmitting data via transitory, propagating signals or carrier waves (e.g., electromagnetism) via a wired or wireless connection.

The routing system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the routing system may be implemented in hardware using, for example, an application-specific integrated circuit ("ASIC").

Figure 4:
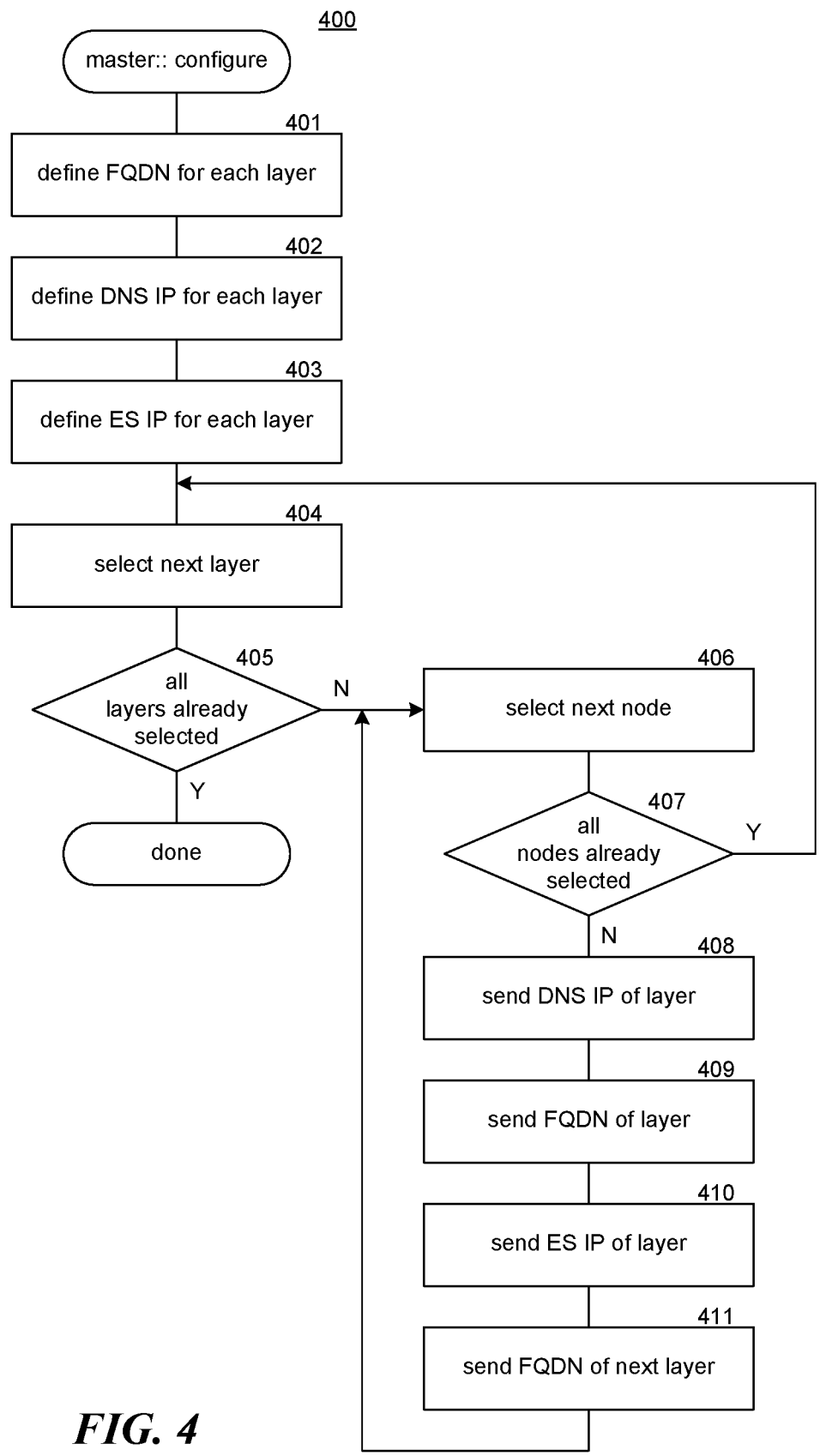
FIG. 4 is a flow diagram that illustrates the processing of a configure component of the master device in some embodiments.

FIG. 4 is a flow diagram that illustrates the processing of a configure component of the master device in some embodiments. The configure component 400 specifies the fully qualified domain name, the DNS anycast IP address, and the edge server anycast IP address for each layer and distributes them to the nodes at each layer. In block 401, the component defines the fully qualified domain name for each layer. In block 402, the component defines the DNS anycast IP address for each layer. In block 403, the component defines the edge server anycast IP address for each layer. In blocks 404-411, the component loops, distributing the configuration information to the nodes in each layer. In block 401, the component selects the next inner layer starting with the outermost layer. In decision block 405, if all the layers have already been selected, then the component returns, else the component continues at block 406. In block 406, the component selects the next node of the selected layer. In decision block 407, if all the nodes of the selected layer have already been selected, then the component loops to block 404 to select the next layer, else the component continues at block 408. In block 408, the component sends the DNS anycast IP address for the selected layer to the node. In a block 409, the component sends the fully qualified domain name of the selected layer to the selected node. In block 410, the component sends the edge server anycast IP address of the selected layer to the selected node. In block 411, the component sends the fully qualified domain name of the next inner layer to the node, and then loops to block 406 to select the next node of the selected layer.

Figure 5:
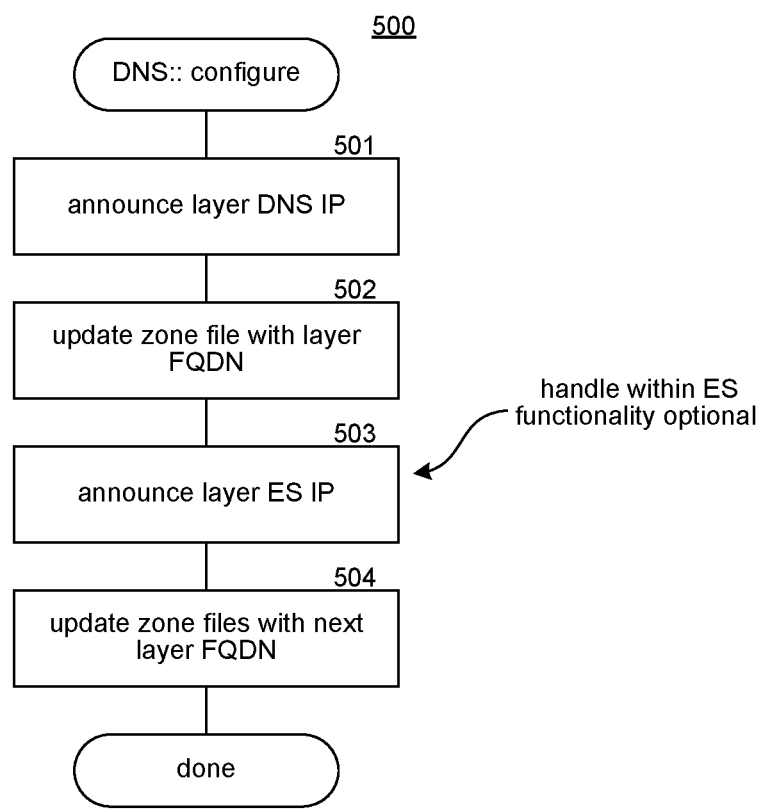
FIG. 5 is a flow diagram that illustrates the processing of a configure component of a DNS in some embodiments.

FIG. 5 is a flow diagram that illustrates the processing of a configure component of a DNS in some embodiments. The configure component 500 is invoked to configure the domain names and IP addresses of a node. In block 501, the component announces the DNS anycast IP address for the layer to which the node is assigned. In block 502, the component updates the zone file with the fully qualified domain name assigned to the layer of the node. In block 503, the component announces the edge server anycast IP address that is assigned to the layer of the node. The announcement of the edge server anycast IP address may actually be performed by the associated edge server. In block 504, the component updates the zone files with the fully qualified domain name for the next layer and then completes.

Figure 6:
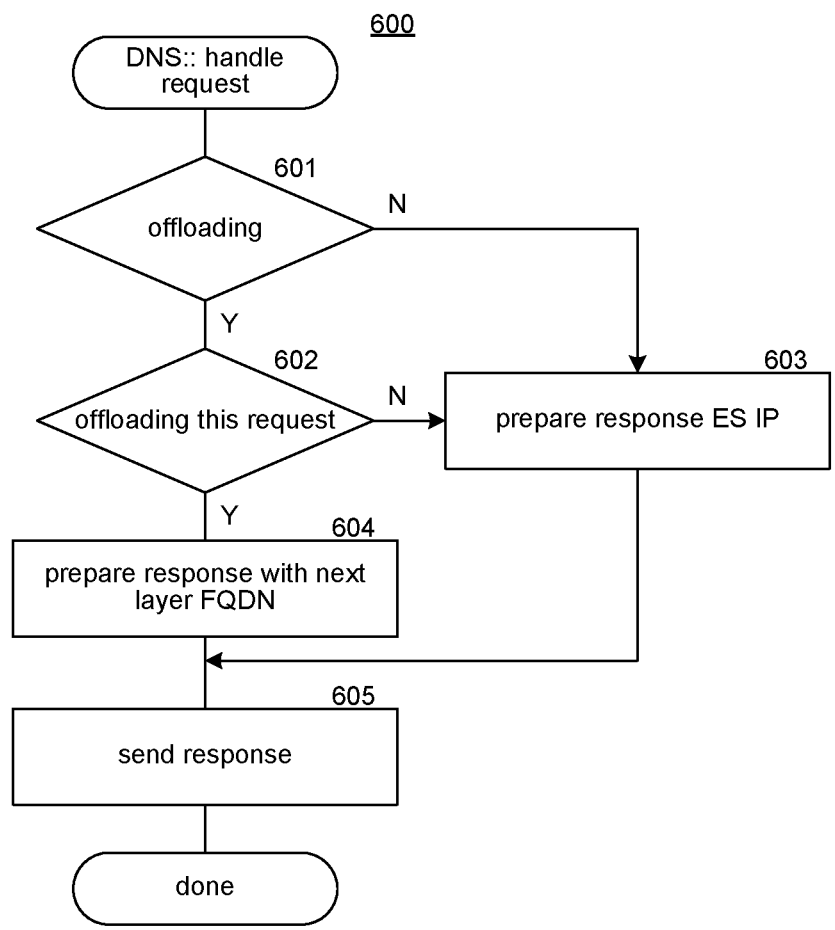
FIG. 6 is a flow diagram that illustrates the processing of a handle request component of a DNS in some embodiments.

FIG. 6 is a flow diagram that illustrates the processing of a handle request component of a DNS in some embodiments. The handle request component 600 is passed a fully qualified domain name that has been received from a client. In decision block 601, if the DNS is offloading the load from the associated edge server, then the component continues at block 602, else the component continues at block 603. In decision block 602, if this resolution request is to be offloaded, then the component continues at block 604, else the component continues at block 603. To determine whether to offload a request when offloading, the component may ensure that the offloading percentage of the last 100 messages has been offloaded. In block 603, the component prepares a response to direct the client to the edge server anycast IP address for the layer to which the node is assigned and continues at block 605. In block 604, the component prepares a response to direct the client to the fully qualified domain name of the next inner layer. In block 605, the component sends the response and then completes.

Figure 7:
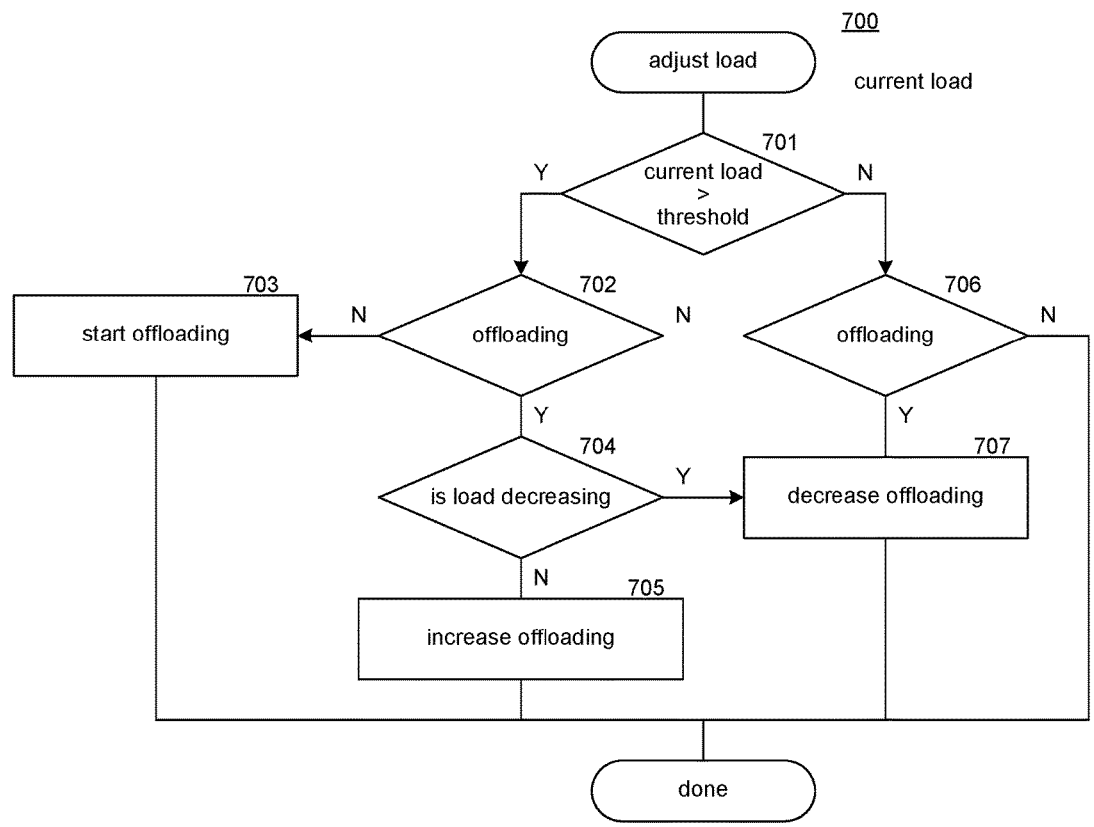
FIG. 7 is a flow diagram that illustrates the processing of an adjust load component of a load controller in some embodiments.

FIG. 7 is a flow diagram that illustrates the processing of an adjust load component of a load controller in some embodiments. The adjust load component 700 is passed a current load and instructs the DNS on whether to offload and how much to offload. In decision block 701, if the current load is above a threshold load, then the component continues at block 702, else the component continues at block 706. In block 702, if the DNS is currently offloading requests, then the component continues at block 704, else the component continues at block 703. In block 703, the component instructs the DNS to start offloading and then completes. In decision block 704, if the load on the edge server is decreasing (e.g., because of the offloading), then the component continues at block 707, else the component continues at block 705. In block 705, since even with offloading the load is not increasing, the component instructs the DNS to increase the offloading and then completes. In decision block 706, if the DNS is currently offloading, then the component continues at block 707, else the component completes. In block 707, the component instructs the DNS to decrease the offloading and then completes.

In some embodiments, an edge server node comprises an edge server, a DNS, and a load controller. The DNS is assigned to a layer of edge server nodes where each layer of edge server nodes has a DNS anycast IP address for the DNSs of that layer and a FQDN for that layer. The DNS either handles or offloads requests to resolve the FQDN for the assigned layer to balance the load on the edge server. A request is offloaded by returning the FQDN for another layer. The load controller monitors the load on the edge server and directs the DNS to offload requests to reduce the load on the edge server.

In some embodiments, the routing system load balances the load for systems by associating each system in a first group of systems and name servers ("NSs") with a NS in the first group and each system in a second group of systems and NSs with a NS in the second group. A NS maps a name to an address or more generally one identifier to another identifier. The systems may be computing devices such edge servers, file servers, CDN servers, and web hosting servers. The routing system also assigns a first NS anycast address to the NSs in the first group and a first name to the systems in the first group, and a second NS anycast address to the NSs in the second group and a second name to the systems in the second group. When a first receiving NS in the first group receives a request sent to the first NS anycast address for resolution of the first name, the routing system determines whether the load on the system associated with the first receiving NS should be handled by the associated system. If so, the first receiving NS handles the request by returning an address of the associated system. If not, the first receiving NS offloads the request by returning the second name so that a second receiving NS from the second group can handle the request and return an address of the system of the second group associated with the second receiving NS.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A non-transitory computer-readable storage medium storing computer-executable instructions for controlling a network of nodes, each node of the network of nodes having a domain name server (DNS) and an edge server (ES) to load balance traffic for the ES, the computer-executable instructions comprising instructions that when executed:

access a first DNS anycast Internet Protocol (IP) address and a first fully qualified domain name (FQDN), the first DNS anycast IP address and the first FQDN being associated with each node from a first layer of nodes of the network of nodes, wherein the first layer of nodes includes N number of nodes and N is an integer greater than one; and announce the first DNS anycast IP address of the first layer of nodes; and when a request to resolve the first FQDN for the first layer of nodes is received by the DNS of one node of the first layer of nodes:

when a load on the ES of the one node indicates that the DNS of the one node should not be offloading load from the ES of the one node, handle the request by returning an ES anycast IP address for the ES of the one node; and when the load on the ES of the one node indicates that the DNS of the one node should be offloading load from the ES of the one node, offload the request by returning a second FQDN of a second layer of nodes of the network so that the second FQDN of the second layer of nodes is resolved to a second DNS anycast IP address, the second FQDN and the second DNS anycast IP address being associated with each node from the second layer of nodes, wherein the second layer of nodes includes M number of nodes and M is an integer greater than zero and less than N.

2. The non-transitory computer-readable storage medium of claim 1 wherein the first FQDN of the first layer of nodes of the network is different than the second FQDN of the second layer of nodes of the network.

3. The non-transitory computer-readable storage medium of claim 2 wherein the first DNS anycast IP address of the first layer of nodes of the network is different than the second DNS anycast IP address of the second layer of nodes.

4. The non-transitory computer-readable storage medium of claim 1 wherein the computer-executable instructions further comprise instructions that when executed:
when a request to resolve the second FQDN for the second layer of nodes is received by the DNS of a second one node of the second layer of nodes:
when a second load on the ES of the second one node indicates that the DNS of the second one node should not be offloading load from the ES of the second one node, handle the request by returning an ES anycast IP address for the ES of the second one node; and
when the second load on the ES of the second one node indicates that the DNS of the second one node should be offloading load from the ES of the second one node, offload the request by returning a third FQDN of a third layer of nodes of the network so that the third FQDN of the third layer of nodes is resolved to a third DNS anycast IP address, the third FQDN and the third DNS anycast IP address being associated with each node from the third layer of nodes,
wherein the third layer of nodes includes P number of nodes,
P is an integer greater than zero and less than M,
M is an integer greater than one and less than N,
and N is an integer greater than two.

5. The non-transitory computer-readable storage medium of claim 4 wherein the second one node is assigned to both the first layer of nodes and to the second layer of nodes.

6. The non-transitory computer-readable storage medium of claim 1 wherein the DNS of the one node and the ES of the one node execute on a same computer.

7. The non-transitory computer-readable storage medium of claim 1 wherein the DNS of the node and the ES of the node are in geographic proximity and connected via the same Internet service provider (ISP).

8. The non-transitory computer-readable storage medium of claim 1 wherein a geographic distribution of the nodes of the first layer of nodes is greater than a geographic distribution of the nodes of the second layer of nodes.

9. The non-transitory computer-readable storage medium of claim 1 wherein the computer-executable instructions include instructions that when executed:
handle the request by returning the ES anycast IP address for the ES of the one node when a central processing unit (CPU) utilization is less than a threshold; and
offload the request by returning the second FQDN of the second layer of nodes of the network when a CPU utilization is greater than the threshold.

10. The non-transitory computer-readable storage medium of claim 9 wherein the computer-executable instructions include computer-executable instructions that when executed, by returning the second FQDN of the second layer of nodes of the network, offload a percentage of received requests according to an offloading percentage.

11. The non-transitory computer-readable storage medium of claim 10 wherein the computer-executable instructions include computer-executable instructions that when executed, determine the offloading percentage based on a comparison of the CPU utilization and the threshold.

12. The non-transitory computer-readable storage medium of claim 1 wherein request handling capacities of first ESes of the nodes of the first layer of nodes are less than request handling capacities of second ESes of the nodes of the second layer of nodes.

13. A network of nodes, each node of the network including a domain name server (DNS) and an edge server (ES), the network comprising:
a first layer of nodes including N nodes, wherein N is an integer greater than one, and wherein the first layer of nodes has:
a first DNS anycast Internet Protocol (IP) address for the DNSes of the ESes of the first layer; and
a first fully qualified domain name (FQDN) for the first layer of nodes, wherein the first DNS anycast IP address and the first FQDN are associated with each node from the first layer of nodes; and
a second layer of nodes including M nodes, wherein M is an integer greater than zero and less than N, wherein the second layer of nodes has:
a second DNS anycast IP address for the DNSes of the ESes of the second layer of nodes; and
a second FQDN for the second layer of nodes, wherein the second DNS anycast IP address and the second FQDN are associated with each node from the second layer of nodes, and wherein the DNS of one node of the first layer of nodes includes:
a component that either:
handles a request to resolve the first FQDN for the first layer by returning an ES anycast IP address for the ES of the one node; or
offloads the request to resolve the first FQDN for the first layer by returning the second FQDN of the second layer of nodes so that the second FQDN of the second layer of nodes is resolved to the second DNS anycast IP address of the second layer of nodes; and
a load controller that monitors load on the ES of the one node and that, based on a load on the ES of the one node, directs the DNS of the one node to handle requests or offload requests.

14. The network of claim 13 wherein the load controller directs the DNS of the one node to:
handle the request by returning the ES anycast IP address for the ES of the one node when a central processing unit (CPU) utilization is less than a threshold; and
offload the request by returning the second FQDN of the second layer of nodes of the network when the CPU utilization is greater than the threshold.

15. The network of claim 14 wherein the load controller directs the DNS of the one node to offload a percentage of received requests according to an offloading percentage.

16. The network of claim 15 wherein the load controller determines the offloading percentage based on a comparison of the CPU utilization and the threshold.

17. The network of claim 14 wherein request handling capacities of first ESes of the nodes of the first layer of nodes are less than request handling capacities of second ESes of the nodes of the second layer of nodes.

18. A method of load balancing nodes of a network, each node of the network including a domain name server (DNS) and an edge server (ES), the method comprising:
assigning N nodes to a first layer of nodes having a first DNS anycast Internet Protocol (IP) address and a first fully qualified domain name (FQDN), wherein the first DNS anycast IP address and the first FQDN is associated with each node from the first layer of nodes, and wherein N is an integer greater than one;

assigning M nodes to a second layer of nodes having a second DNS anycast IP address and a second FQDN, wherein the second DNS anycast IP address and the second FQDN is associated with each node from the second layer of nodes, and wherein M is an integer greater than zero and less than N, when a request to resolve the first FQDN for the first layer of nodes is received by the DNS of one node of the first layer of nodes:

when a load on the ES of the one node is less than a threshold, handle the request by returning an ES anycast IP address for the ES of the one node; and when the load on the ES of the one node is greater than the threshold, offload the request by returning the second FQDN of the second layer of nodes of the network so that the second FQDN of the second layer of nodes is resolved to the second DNS anycast IP address of the second layer of nodes.

19. The method of claim 18 further comprising:

assigning P nodes to a third layer of nodes having a third DNS anycast IP address and a third FQDN, wherein the third DNS anycast IP address and the third FQDN is associated with each node from the third layer of nodes, and wherein P is an integer greater than zero and less than M, wherein M is an integer greater than one and less than N, and wherein N is an integer greater than two, when a request to resolve the second FQDN for the second layer of nodes is received by the DNS of a second one node of the second layer of nodes:

when a second load on the ES of the second one node is less than a second threshold, handling the request by returning a second ES anycast IP address for the ES of the second one node; and when the second load on the ES of the second one node is greater than the second threshold, offloading the request by returning the third FQDN of the third layer of nodes of the network so that the third FQDN of the third layer of nodes is resolved to the third DNS anycast IP address of the third layer of nodes, wherein M is an integer greater than one and less than N, and wherein N is an integer greater than two.

20. The method of claim 18 wherein request handling capacities of first ESes of the nodes of the first layer of nodes are less than request handling capacities of second ESes of the nodes of the second layer of nodes.

* * * * *